United States Patent [19]
Greene

[11] Patent Number: 5,272,731
[45] Date of Patent: Dec. 21, 1993

[54] PROCESS AND APPARATUS TO INCREASE PLASMA TEMPERATURE IN A CONTINUOUS DISCHARGE FUSION REACTOR

[76] Inventor: Norman D. Greene, 4511 Sun Valley Rd., Del Mar, Calif. 92014

[21] Appl. No.: 922,189

[22] Filed: Jul. 30, 1992

Related U.S. Application Data

[63] Continuation-in-part of Ser. No. 743,704, Aug. 12, 1991, abandoned, which is a continuation of Ser. No. 354,845, May 22, 1989, abandoned.

[51] Int. Cl.$^5$ .............................................. G21B 1/00
[52] U.S. Cl. .................................. 376/130; 376/127; 376/139; 376/146
[58] Field of Search .............................. 376/127–130, 376/135, 125, 126, 107, 139, 140, 141, 146, 318, 319

[56] References Cited

U.S. PATENT DOCUMENTS

| | | |
|---|---|---|
| 2,910,414 | 10/1959 | Spitzer, Jr. . |
| 3,022,236 | 2/1962 | Ulrich et al. . |
| 3,071,525 | 1/1963 | Christofilos . |
| 3,214,342 | 10/1965 | Linhart . |
| 3,265,583 | 8/1966 | Baker et al. . |
| 3,270,496 | 9/1966 | Rom . |
| 3,290,552 | 12/1966 | Van Ornum . |
| 3,369,140 | 2/1968 | Furth . |
| 3,442,758 | 5/1969 | Penfold et al. . |
| 3,708,391 | 1/1973 | Christofilos . |
| 3,711,370 | 1/1973 | von Ohain et al. . |
| 3,733,248 | 5/1973 | Hendel et al. . |
| 3,749,639 | 7/1973 | Kapitza . |
| 4,065,351 | 12/1977 | Jassby et al. . |
| 4,140,057 | 2/1979 | Turchi et al. . |
| 4,416,845 | 11/1983 | Salisbury . |
| 4,894,199 | 1/1990 | Rostoker . |

OTHER PUBLICATIONS

The Random House College Dictionary, Revised Edition (1980), pp. 1084, 1278.

*Primary Examiner*—Harvey E. Behrend
*Attorney, Agent, or Firm*—William W. Haefliger

[57] ABSTRACT

The process for containing a deuterium gas plasma discharge includes providing a cylindrical zone having a cylinder axis; supplying $D_2$ gas to the zone axially lengthwise of the zone and substantially tangentially relative to the zone and via multiple lengthwise, elongated inlets to produce vortex flow in a gas column about the axis, in the zone, the inlets spaced about the zone; causing excitation of the gas in the rotating column, by transmission of electromagnetic energy into the column, to produce ionization of the gas within a central portion of the zone, thereby forming a plasma column; permitting the plasma column to rotate with the surrounding non-ionized gas in the gas column, thereby constraining heat loss from the surface of the plasma column to the conduction mode; and allowing substantially tangential exiting of gas from the zone by providing sufficient spacing between the inlets so that gas may exit from the periphery of the zone and between the inlets into a surrounding region; and employing blocking structure at opposite ends of the zone to block endwise exiting of gas and plasma therefrom.

11 Claims, 2 Drawing Sheets

PROCESS AND APPARATUS TO INCREASE PLASMA TEMPERATURE IN A CONTINUOUS DISCHARGE FUSION REACTOR

BACKGROUND OF THE INVENTION

This application is a continuation-in-part of Ser. No. 743,704 filed Aug. 12, 1991, (now abandoned), which is a continuation of Ser. No. 354,845, filed May 22, 1989 (now abandoned).

This invention relates generally to method and means to increase plasma temperatures in a continuous discharge fusion reactor. More particularly it concerns provision of an insulating layer rotating synchronously with the plasma, for reducing plasma boundary heat losses.

It is well known that high frequency heating of a plasma, because of its high electrical conductivity, occurs at its surface due to the skin effect. In this mode of heating, most of the energy is transferred to the electrons at the plasma sheath. Simultaneously, energy is lost from this surface by dissociation, conduction and radiation. In the previous work (Ref. 2, page 998), neglecting radiation and Bremstrallung, these losses have been shown to amount nearly to the entire power expended in excitation. The results of the reference research showed that approximately 50% of the excitation power was lost by dissociation-recombination heat transfer and the balance by conduction to the surrounding, convecting gases.

If, however, the convecting gas surrounding the dissociated gas layer is replaced with the thick layer of non-convecting gas, overall heat losses can be greatly reduced. Because heat loss through this layer takes place by conduction only, the radial loss through a gas layer of, say, 10 cm. can be derived. Thus, for radial heat conduction in a cylinder of deuterium gas:

$$q = k_m \times 2Pi \times L \times T / \ln(x_2/x_1) \qquad \text{Eq. 1}$$

where
$k = 81 \times 10 \exp(-4)$ cal/sec. cm. Deg. K
$x = 1.2$ cm., $x = 12.2$ cm.
$L = 10$ cm.
$T = (7000-1000)$ Deg. K
Therefore, $q = 557$ Watts The thermal conductivity used in Eq. 1 represents a mean value for the temperature range of 7000 to 1000 Deg. K., where 1000 Deg. K. is a reasonable temperature for useful power extraction. The remaining values are obtained from published data in Ref. 2, page 998. Evaluation of Eq. 1 yields a conductive loss alone of only 7% of the losses shown in Ref. 2, page 998.

The remaining major heat loss fraction is a result of dissociation-recombination in the gas layer external to the plasma sheath, and interior to the thick, gas layer discussed above. Similarly, this dissociation layer also possesses a finite thermal resistance to the flow of heat, despite its small magnitude. Thus, for a given, overall temperature drop between the plasma sheath and the outer surface of the gas column, the total heat loss will be inversely proportional to the sum of the thermal resistances of both the dissociation and quiescent layers. On this basis, the heat loss determined in Eq. 1 is considered as conservative.

Accordingly, there is need for method and means to produce an insulating layer of gas, surrounding the dissociated gas.

SUMMARY OF THE INVENTION

It is a major object of the invention to provide method and means to meet the above need.

Basically, the method of the invention is embodied in a process for containing a deuterium gas plasma discharge, and includes the steps:

a) providing a cylindrical zone having a cylinder axis, b) supplying $D_2$ gas to said zone axially lengthwise of said zone and substantially tangentially relative to the zone and via multiple lengthwise, elongated inlets to produce vortex flow in a gas column about the axis, in the zone, the inlets spaced about the zone, c) causing excitation of the gas in the rotating column, by transmission of electromagnetic energy into the column, to produce ionization of the gas within a central portion of the zone, thereby forming a plasma column, d) permitting the plasma column to rotate with the surrounding non-ionized gas in the gas column, thereby constraining heat loss from the surface of the plasma column to the conduction mode, e) and allowing substantially tangential exiting of gas from the zone by providing sufficient spacing between the inlets so that gas may exit from the periphery of the zone and between the inlets into a surrounding region, f) and employing blocking means at opposite ends of the zone to block endwise exiting of gas and plasma therefrom.

Typically, the $D_2$ gas is supplied at first locations about the axis, and gas is allowed to exit at second locations about the axis, the second locations provided angularly between the first locations.

It is another object to provide apparatus that embodies at least four of the locations, and at least four of the second locations; and typically, the first locations are provided at about 0°, 90°, 180°, and 270° about the axis; and they may also be provided at about 45°, 135°, 225°, and 315° about said axis.

These and other objects and advantages of the invention, as well as the details of an illustrative embodiment, will be more fully understood from the following specification and drawings, in which:

DRAWING DESCRIPTION

FIG. 1 is an axial section; and
FIG. 2 is a section on lines 2—2 of FIG. 1.

DETAILED DESCRIPTION

Figure 1:
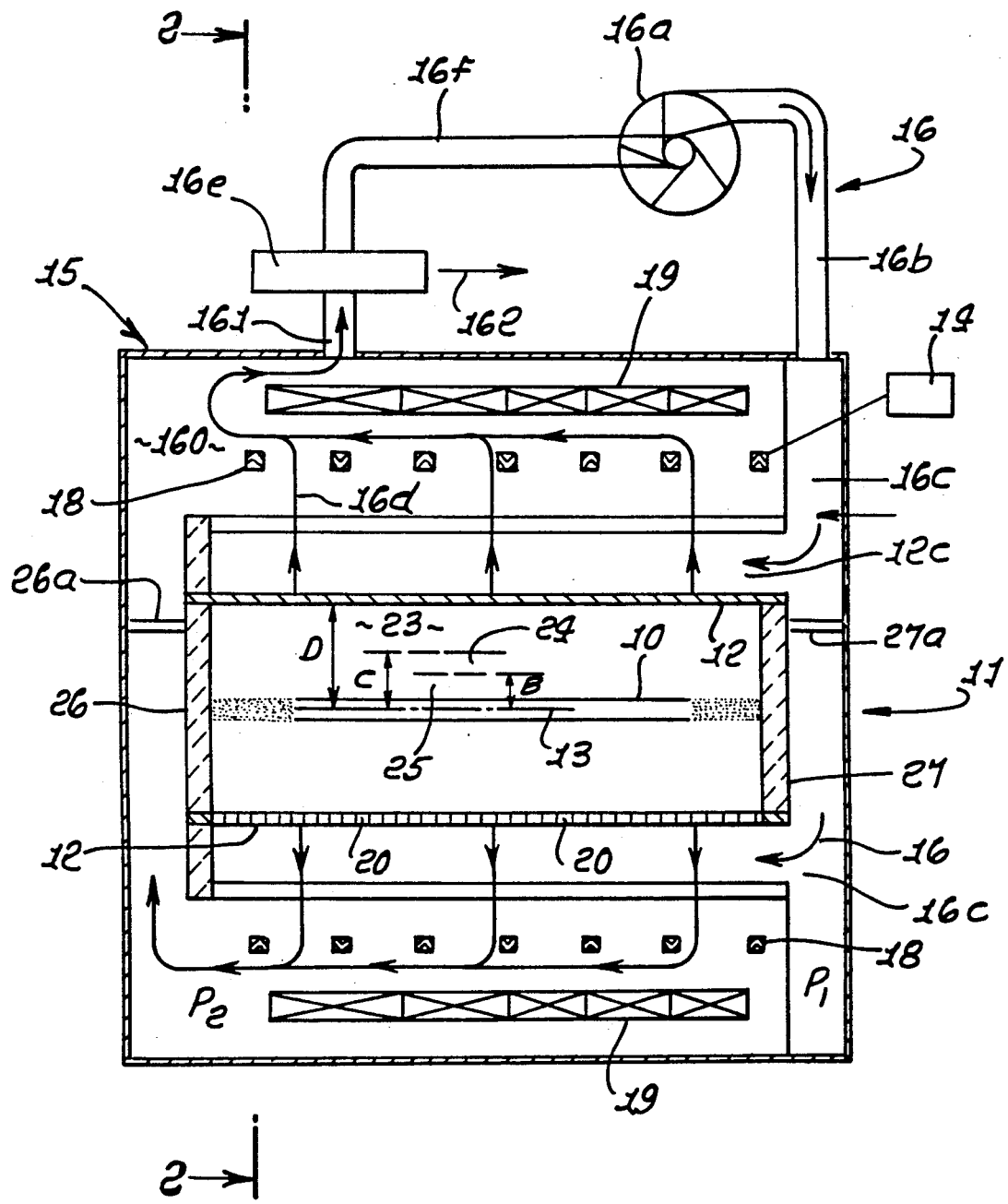
Figure 2:
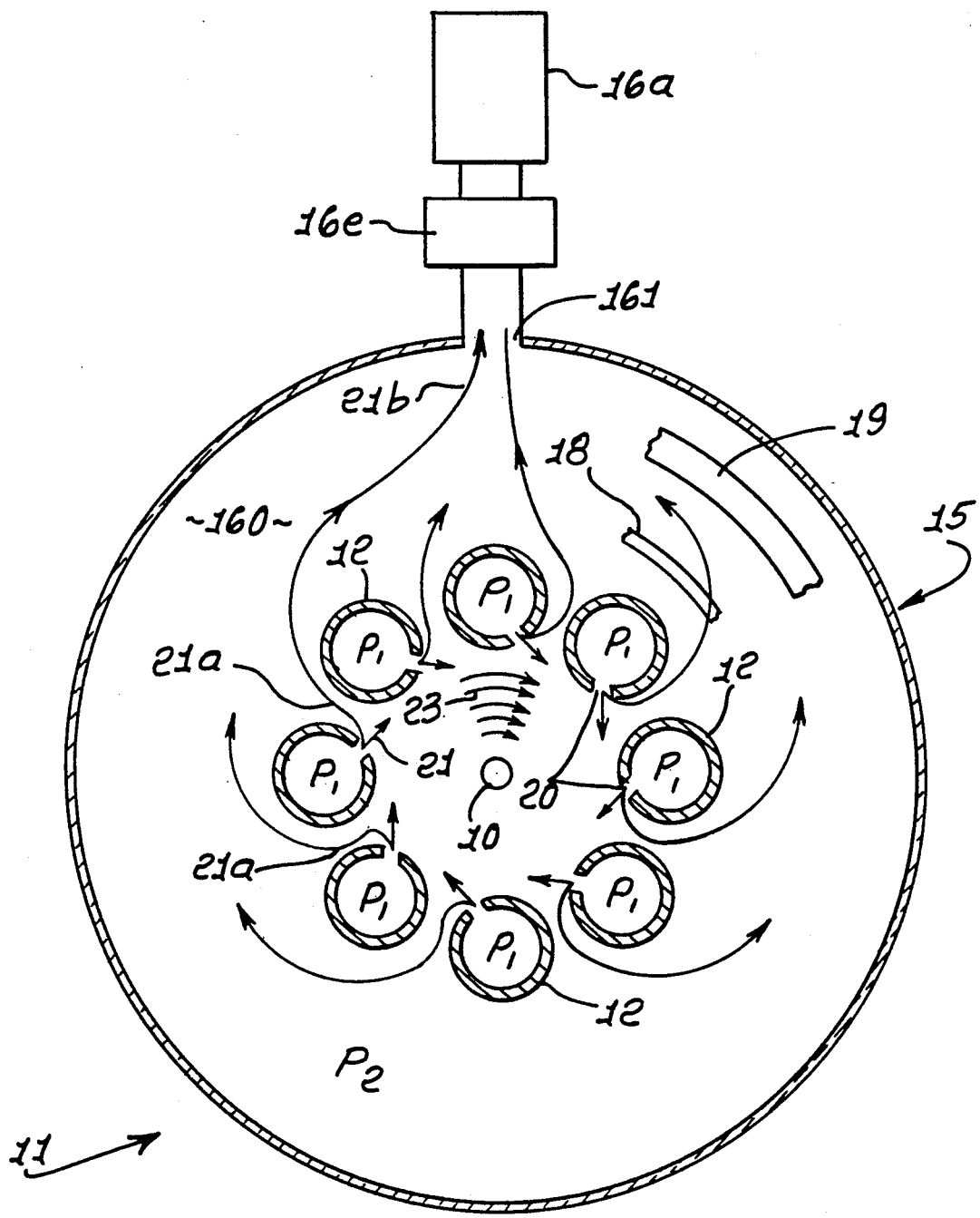

In FIGS. 1 and 2, an axially elongated plasma filament discharge column 10 is established by means that include apparatus generally designated at 11. That apparatus includes a circular series of axially elongated, ceramic inlet manifolds 12, eight of them being shown, at equal circular spacing, i.e., at angles 0°, 45°, 90°—315°. They are equally spaced, radially, from central axis 13, which is the axis of the column 10. Also extending about that axis is a helically wound coil or coils 18 for conducting electrical AC current at a frequency and power to produce the plasma column. Magnetic coils 19 extending annularly about axis 13 provide the well-known "pinch effect" to the plasma, thereby reducing the diameter of the plasma discharge filament or cord. Means to supply energy to the coil or coils 18 is schematically shown at 14. A ceramic shell or container 15 surrounds the coils and manifolds. D$_2$ gas is supplied to the manifolds 12 at 16, to flow lengthwise therein, and at pressure sufficient to effect rotation of gas, as is described below.

A blower 16a exhausts D$_2$ to duct 16b to flow at 16c to the manifolds, via end openings 12c, 16c being a high-pressure P$_1$ distribution chamber to which the manifolds 12 are endwise open. D$_2$ passing from the manifolds flows at 16d in low pressure P$_2$ chamber 160 and through outlet 161 to a heat exchanger 16e and returns at 16f to the blower. The heat exchanger withdraws useful heat from the D$_2$ flow, for transfer at 162 to a utilization means.

The manifolds have exit openings or slits 20 extending along their lengths, and located to discharge streams 21 of D$_2$ gas generally tangentially about the axis 13, and in the same clockwise (or counterclockwise) directions at the manifold locations; the flow streams initially having small components that are directed to effect rotation of gas in a region 23, about axis 13, and between that axis and the manifolds. Region 23 is defined as a cylinder between radii D and C, as seen in FIG. 1, wherein some rotation and turbulence exist. Coherently rotating cylindrical gas region or zone 24 is defined between radii C and B; and eventually solid body-type rotating gas annular region 25 is defined between radius B and column 10. The plasma boundary (cylindrical) is defined by column 10.

Ceramic end plates 26 and 27 extend normal to axis 13, and function as vortex retainer barriers. They may be carried by shell 15, by suitable means, as for example mounts 26a and 27a.

The generally tangential streams 21 act to induce rotation of D$_2$ gas in region 23, extending about axis 13, as by frictional drag or vortex action; and the deuterium D$_2$ in region 24 is also rotated. Portions of the stream flow outwardly at 21a, to be exhausted from the chamber at 21b, for resupply to the manifolds, as via a blower or pump 27.

In regard to the above operation, gaseous helical flow systems are accompanied by fluid shear, particularly when fluid enters a region tangentially and exists at a distance from the inlet. Normally, such flows possess the characteristics of both forced and free vortices; in both cases, fluid shear is present to satisfy continuity requirements. As such, both axial, as well as radial, flow result as the normal decay from helical to linear flow occurs.

A flow field, in which fluid enters a cylindrical region tangentially at a given radius and spirals inwardly to leave at a smaller radius, as in a free vortex, establishes a central core of rotating fluid. If the flow field were axially unconstrained, the fluid would helically exit the flow plane in opposite directions; however, if the flow is constrained at both outlets, as by plates 26 and 27, and forced to depart at the inlet radius, a tangential velocity component is imparted to the fluid, as referred to at 23. Because of the absence of both radial and axial shear components, the cylindrical body of fluid rotates as a solid body, similar to a roller bearing.

Heat, from the plasma discharge column 10 at the axis 13 of the cylinder of gas, escapes to the exterior only by means of radiation, dissociation and conduction. In this flow system, the high gravity forces present also stabilize and concentrate the less dense, higher temperature gas within the core.

In summary, the region of plasma rotation is developed at the center 10 of the vortex by the tangentially flowing gas and constrained by plane barriers 26 and 27, at each end of the cylinder. At a radius less than that of the inlets and outlets, and at a distance sufficient to dampen the turbulence created at the inlets by the tangentially flowing gases, a cylinder of gas rotates as a unit. This occurs from the absence of any drag forces or pressure differences which would result in radial or axial flow. Drag forces at both axial barriers are neglected; however, such forces may be compensated for by increasing vorticity at each barrier.

Within radius B, near the center of rotation, the encompassed column of gas possesses a velocity distribution directly proportional to the radius. External to radius B, a region of turbulence and higher velocities exists and serves only to maintain rotation.

As in a rotating flow system, a radial pressure gradient is present. It is of interest to note that the tangential gas velocity component in vortex flow can attain high velocities. For example, at radius B (FIG. 1), a velocity of 400 meters/sec. would produce a sixty-fold difference in density between the center and periphery with deuterium gas (Ref. 7); however, lower velocities are equally as effective in generating a solid body-type rotating gas column. When the rotating column is excited by microwave radiation, ionization occurs within the least dense region at the axis. The resulting column 10 of plasma, constrained by the density gradient, rotates synchronously with the balance of the gas due to a lack of constraints. Thus, an insulating gas layer 25 surrounds the plasma discharge region.

In the above, some of the supplied D$_2$ diffuses into the rotating mass of gas, for supply to the plasma zone as "fuel" for the reaction.

I claim:

1. In the process for containing a deuterium gas plasma discharge, the steps that include:
   a) providing a cylindrical zone having a cylinder axis, and providing a region surrounding said cylindrical zone,
   b) providing manifold means defining a plurality of gas inlet tubes spaced about said axis, the tubes defining multiple lengthwise elongated inlets to said zone, supplying D$_2$ ga to said zone axially lengthwise of said zone and substantially tangentially relative to said zone and via said multiple lengthwise, elongated inlets thereby forming a gas column and producing vortex flow about said column to cause rotation of the column about said axis, said inlets spaced about said zone,
   c) causing excitation of the gas in said rotating column by transmission of electromagnetic energy into the column, to produce ionization of the gas within a central portion of said zone, thereby forming a plasma column,
   d) the plasma column rotating with surrounding nonionized gas in said gas column,
   e) and allowing outward exiting of gas from said zone by providing spaces between said tubes so that gas may exit from the periphery of said zone and between said tubes into said surrounding region, and providing means operating to withdraw gas from said surrounding region and to resupply gas to said inlets,
   f) and employing blocking means at opposite ends of said zone to block endwise exiting of gas and plasma therefrom.

2. The process of claim 1 wherein said tubes have walls defining through slits at first slit locations extending lengthwise of the tubes, and wherein $D_2$ gas is supplied via said tubes to pass through said slits to said zone, and gas is allowed to exit said zone at second locations about said axis and defined by said spaces, said second locations provided between said tubes and spaced about said axis.

3. The process of claim 2 including providing at least four of said first slit locations, and at least four of said second locations.

4. The process of claim 3 wherein said first slit locations are also provided at about 0°, 90°, 180°, and 270° about said axis.

5. The process of claim 4 wherein said first slit locations are also provided at about 45°, 135°, 225°, and 315° about said axis.

6. The process of claim 3 wherein said second locations are provided at locations between said first slit locations.

7. The process of claim 1 including enclosing said zone at axially opposite ends thereof.

8. The process of claim 1 including blocking axially endwise escape of the gas, from said column, thereby to create vortex flow in said zone.

9. The process of claim 1 including locating said tubes in a circular series with said spaces therebetween, and allowing said exiting of the $D_2$ gas along flow paths that extend through said spaces between the tubes.

10. The method of claim 7 including carrying out said rotating of the plasma column to allow heat transmission to the exterior from said plasma column by the following:
 i) radiation
 ii) dissociation
 iii) conduction.

11. The method of claim 1 wherein $D_2$ gas is supplied via said slits and tangentially to said rotating gas column.

* * * * *